Figure 1:
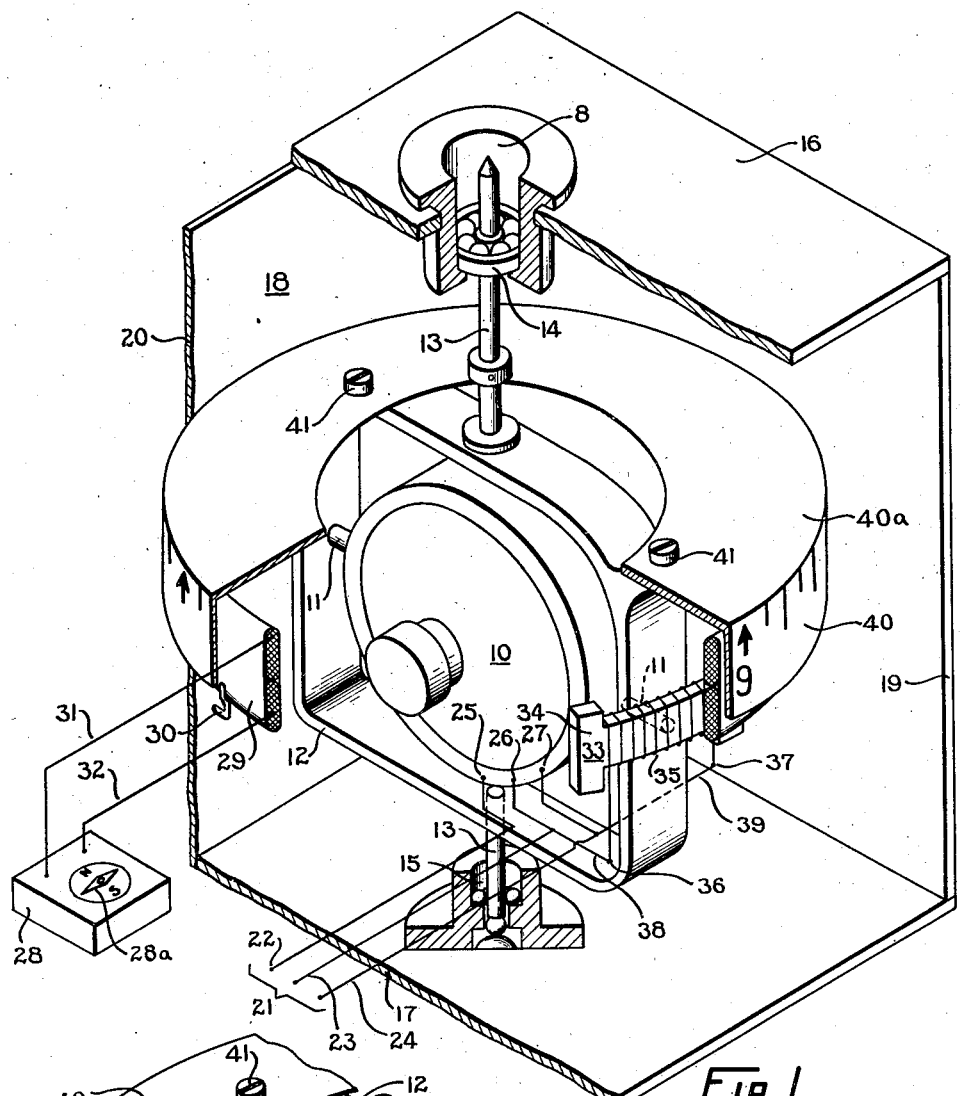

Dec. 17, 1940.　　F. LAUCK ET AL　　2,225,014

CONTROL MEANS FOR GYROSCOPES

Filed May 3, 1939

INVENTORS
Friedrich Lauck
Heinrich Hengsbach
BY Stephen Cerstvik
ATTORNEY.

Patented Dec. 17, 1940

2,225,014

UNITED STATES PATENT OFFICE 2,225,014

CONTROL MEANS FOR GYROSCOPES

Friedrich Lauck, Lubeck-Travemunde, and Heinrich Hengsbach, Berlin-Charlottenburg, Germany, assignors to Siemens Apparate und Maschinen Gesellschaft mit beschränkter Haftung, Berlin, Germany, a corporation of Germany Application May 3, 1939, Serial No. 271,598
In Germany April 27, 1938

3 Claims. (Cl. 33—204)

This invention relates to gyroscopes, and more particularly to means for controlling the position of a gyroscope relative to a mounting therefor.

One of the objects of the present invention is to provide novel means for controlling the precessional movements of a gyroscope.

Another object of the invention is to provide means which are energized in a novel manner for controlling a gyroscope.

An additional object is to provide novel means for controlling a field produced by an electric apparatus for governing a gyroscope.

The above and further objects and novel features will more fully appear from the following detailed description when the same is read in connection with the accompanying drawing. It is to be expressly understood, however, that the drawing is for purposes of illustration only and is not intended as a definition of the limits of the invention, reference for this latter purpose being had to the appended claims.

Figure 2:
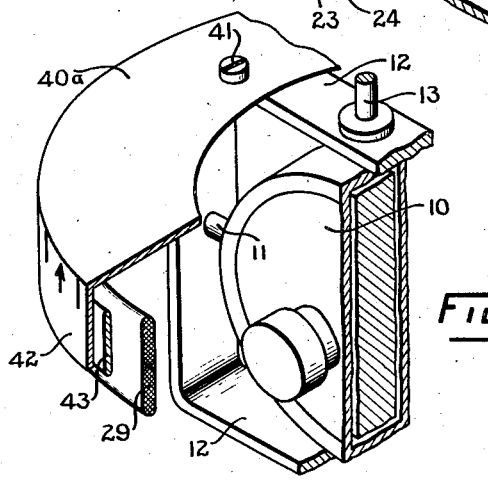

In the drawing, wherein like reference characters refer to like parts throughout the several views, Fig. 1 is a perspective view, partly in section and with parts broken away, illustrating one embodiment of the present invention; and, Fig. 2 is a perspective view, partly in section and with parts broken away, of a second embodiment of the invention.

The forms of the invention illustrated in the accompanying drawing, by way of example, comprise an electrically drivable gyro rotor in gimbal ring suspension which may be employed in combination with suitable pilot and direction indicating means for controlling the course of a vehicle such as an aircraft. Novel means are provided for controlling precessional movements of the gyro comprising an electro-magnetic coil which is stationarily mounted relative to said suspension and which is concentrically mounted relative to the outer or frame trunnions of the suspension. Suitable means are provided for controlling a flow of electric energy to the coil in accordance with the indications, for example of the abovementioned direction indicating means. A field is produced by this energy flowing in the coil which cooperates with a field of an electro-magnet, the latter being attached to an inner or housing trunnion of the gimbal suspension. A precession is thereby produced about the outer or frame trunnions. A common source of electric energy moves the rotor and energizes said magnet. Suitable means of magnetic material are provided for concentrating the flux of the coil in a predetermined manner in order to increase the effectiveness thereof.

In the form shown in Fig. 1 is a gyro which is employed in combination with a direction indicating apparatus, the latter controlling the precession of the gyro in a manner to appear later. The gyro is constituted by an electrically drivable gyro rotor (not shown) in a gimbal ring suspension comprising a rotor housing 10 which is preferably positioned to place the axis of rotation of the rotor in the horizontal. Housing 10 is rotatably mounted by means of inner trunnions 11 upon a gimbal frame 12. The latter is rotatably mounted by means of outer trunnions 13 in suitable bearings 14 and 15, located in the upper and lower surfaces 16 and 17 respectively of an outer protecting structure 18 having side walls 19 and 20. The gyro rotor may be driven in a conventional manner, for example by three phase current from a source 21, which by leads 22, 23, 24 is connected to suitable terminals 25, 26, 27 upon housing 10.

In order that the axis of rotation of the gyro rotor may follow the movements of a governing device such as a control compass 28, suitable means are provided for controlling the precession of said gyro comprising an annular coil 29, which is stationarily mounted relative to the gyro suspension upon side walls 19 and 20 by means of brackets or supporting elements 30. Coil 29 is concentric with outer trunnions 13 and is so arranged that a plane passing through the center of the coil perpendicular to said trunnions will contain the axis of trunnions 11. Coil 29 by leads 31, 32 is in connection with the control compass 28 which by suitable follow-up means (not shown) energizes the coil when the axes of the gyro rotor and of an indicator element 28a of the compass move out of a predetermined azimuthal relationship.

In order that the field of coil 29 may exert a turning moment upon inner trunnions 11 and may thereby produce a precession, an electromagnet 33 having a core 34 is attached at the center thereof to one of the trunnions 11 and is adapted for electrical cooperation with the coil 29. Core 34 is preferably constituted by a plurality of laminations in order to increase the efficiency of the magnet and to reduce electrical losses. The core is provided with an exciter winding 35, having terminals 36, 37 at opposite extremities thereof, and the core, when in a horizontal position, is preferably curved about the axis of trunnions 13. The terminals 36, 37, by means of leads 38, 39, are connected to leads 23, 24 respectively. The vector of the magnetic field in core 34 coincides substantially with the longitudinal axis of said core.

Suitable means for indicating the angular position of the frame member 12 and for concentrating the flux or field existing adjacent the outer surface of coil 29 are provided comprising a compass rose 40 of ferro-magnetic material which is secured to said frame. The rose, in the form illustrated, is constituted by a tubular member mounted concentric with the trunnions 13 and secured to the frame by means of an inner flange 40a and stud bolts 41. The rose is mounted in such a manner that the air gap between the coil 29 and the rose is small. The three elements, including coil 29, magnet 33 and rose 40, are mounted in such a manner that a common plane of symmetry exists therefor, which is perpendicular with reference to the axis of trunnions 13 and contains the axis of trunnions 11.

As above mentioned, a gyro device of the above character may be employed for controlling the course of a vehicle such as an aircraft by governing a suitable pilot arrangement (not shown). The directing or control impulses which may be supplied by the gyro may be taken therefrom, for example by means of a conventional bolometer arrangement (not shown).

In operation, the three-phase current source 21 spins the rotor of the gyro, the axis of rotation thereof being initially positioned in a horizontal plane. Exciter winding 35 is energized by energy from one of the phases of said source. If the axis of rotation of the rotor and the axis of indicating element 28a remain in a proper azimuthal relationship, no current will flow to coil 29 and it will remain unenergized. However, if said azimuthal relationship is changed, a current will flow to coil 29, producing a field which coacts with the field of magnet 33, thereby creating a motor action which tends to rotate the magnet. The moment thus tending to rotate the magnet, and therewith the gyro rotor and housing, produces a precession of the rotor in azimuth in such a direction as to cause the axis of rotation to seek the shortest path to the proper azimuthal relationship with the indicator 28a. When this relationship is restored, the current in coil 29 ceases.

If it is desired to provide a compass rose member 42 of non-magnetic material, an intermediate tubular member 43 of magnetic material (Fig. 2) may be employed, which preferably is mounted upon and insulated from the rose 42. Member 43 is concentric with trunnions 13 and is arranged relative to the above mentioned plane of symmetry in a manner analogous to that of rose 40.

There is thus provided novel means for controlling the precessional movements of a gyroscope. The device is simple in construction, compact in size, and is constituted by a small number of parts. The control of the precession is positive due to the novel manner of energizing magnet 33 and due to the arrangement of coil 29 relative thereto together with the ferro-magnetic member 40 or 43.

Although only two embodiments of the present invention are illustrated and described in detail, it is to be expressly understood that the same is not limited thereto. For example, instead of employing the three-phase source of energy 21 as shown, a suitable two phase alternating current source or a direct current source may be used. Also, instead of employing the device in combination with a control compass, any suitable means for controlling a flow of electric energy may be employed. Various changes may also be made in the design and arrangement of the parts without departing from the spirit and scope of the invention as the same will now be understood by those skilled in the art. For a definition of the limits of the invention, reference will be had primarily to the appended claims.

What is claimed is:

1. In apparatus of the class described, an electrically drivable gyro rotor, a gimbal ring suspension therefor comprising a gimbal frame, and inner and outer gimbal trunnions, a stationary coil mounted concentric with said outer trunnions, an electromagnet attached to an inner trunnion and surrounded by said coil, a source of electric energy for energizing said magnet whereby upon energization of said coil the magnetic fields of the electromagnet and coil coact thus producing movement of said rotor, and a ring member of ferro-magnetic material surrounding said coil for concentrating the field of said coil toward said electro-magnet, said ring constituting a compass rose mounted for movement with said rotor.

2. The combination with an electrically drivable gyro rotor of a gimbal ring suspension therefor comprising a gimbal frame, and inner and outer gimbal trunnions, an electro-magnet attached to one of said inner trunnions, a coil concentric with said outer trunnions surrounding said electro-magnet and adapted for electrical cooperation with said magnet, a compass rose surrounding said coil, a ring member of magnetic material mounted between said rose and coil for concentrating the field of said coil toward said electromagnet, and a common source of energy for moving said rotor and energizing said electro-magnet, said magnet, coil, magnetic ring member, and rose being arranged symmetrically relative to a plane passing through the axis of the inner trunnions and perpendicular to the axis of the outer trunnions.

3. In apparatus of the class described, an electrically driven gyro rotor, a gimbal ring suspension therefor comprising a gimbal frame, and inner and outer gimbal trunnions, a stationary coil mounted concentric with said outer trunnions, an electromagnet attached to an inner trunnion and surrounded by said coil, a source of electrical energy for energizing said magnet whereby upon energization of said coil the magnetic field of the magnet and coil coact to produce movement of said gimbal frame about said outer trunnions, and a ring member concentric with said outer trunnions, and mounted for movement with said frame for concentrating the field of said coil toward said electromagnet.

HEINRICH HENGSBACH.
FRIEDRICH LAUCK.